United States Patent [19]

Tsai

[11] Patent Number: 5,436,986
[45] Date of Patent: Jul. 25, 1995

[54] APPARATUS FOR SWITCHING OPTICAL SIGNALS AMONG OPTICAL FIBERS AND METHOD

[76] Inventor: Jian-Hung Tsai, 10095 Bret Ave., Cupertino, Calif. 95014

[21] Appl. No.: 28,304

[22] Filed: Mar. 9, 1993

[51] Int. Cl.$^6$ .............................. G02B 6/26
[52] U.S. Cl. .................... 385/16; 385/18; 385/21
[58] Field of Search ........................ 385/16–23

[56] References Cited

U.S. PATENT DOCUMENTS

| | | | |
|---|---|---|---|
| 4,208,094 | 6/1980 | Tomlinson, III et al. | 385/18 |
| 4,239,331 | 12/1980 | Aoyama | 385/16 |
| 4,303,303 | 12/1981 | Aoyama | 385/18 |
| 4,322,126 | 3/1982 | Minowa et al. | 385/18 |
| 4,626,066 | 12/1986 | Levinson | 385/22 |
| 4,789,215 | 12/1988 | Anderson | 385/18 |
| 4,790,621 | 12/1988 | Calaby et al. | 385/21 |
| 4,938,555 | 7/1990 | Savage | 385/18 |
| 5,000,534 | 3/1991 | Watanabe et al. | 385/18 |
| 5,028,104 | 7/1991 | Kokoshvili | 385/18 |
| 5,042,889 | 8/1991 | Benzoni | 385/16 |

*Primary Examiner*—John D. Lee
*Assistant Examiner*—Phan Thi Heartney
*Attorney, Agent, or Firm*—Lyon & Lyon

[57] ABSTRACT

An optical switch wherein mirrors move between two positions in order to transmit optical signals between input fibers and output fibers. In a first position, the optical signal is transmitted by input fibers through a one-quarter pitch of Grade Index Refractive (GRIN) lens. The light signal is then reflected by a first mirror and second mirror such that its path carries it to a focusing one-quarter GRIN lens, and to output fibers. With the mirrors in its second position, the optical signal is transmitted directly from input fibers, through one-quarter pitch of Grade Index Refractive (GRIN) lens, to a focusing one-quarter GRIN lens, and to output fibers, thereby resulting in an unreflected light signal path.

33 Claims, 8 Drawing Sheets

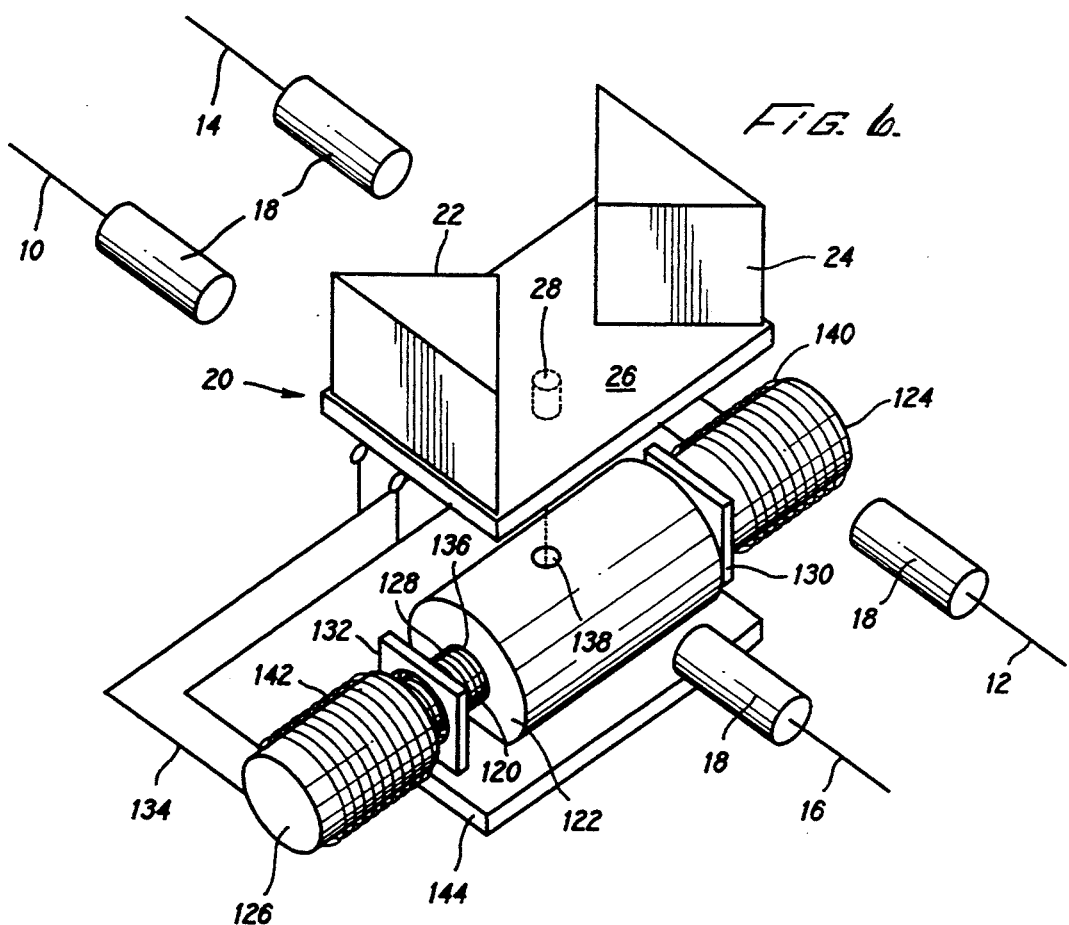
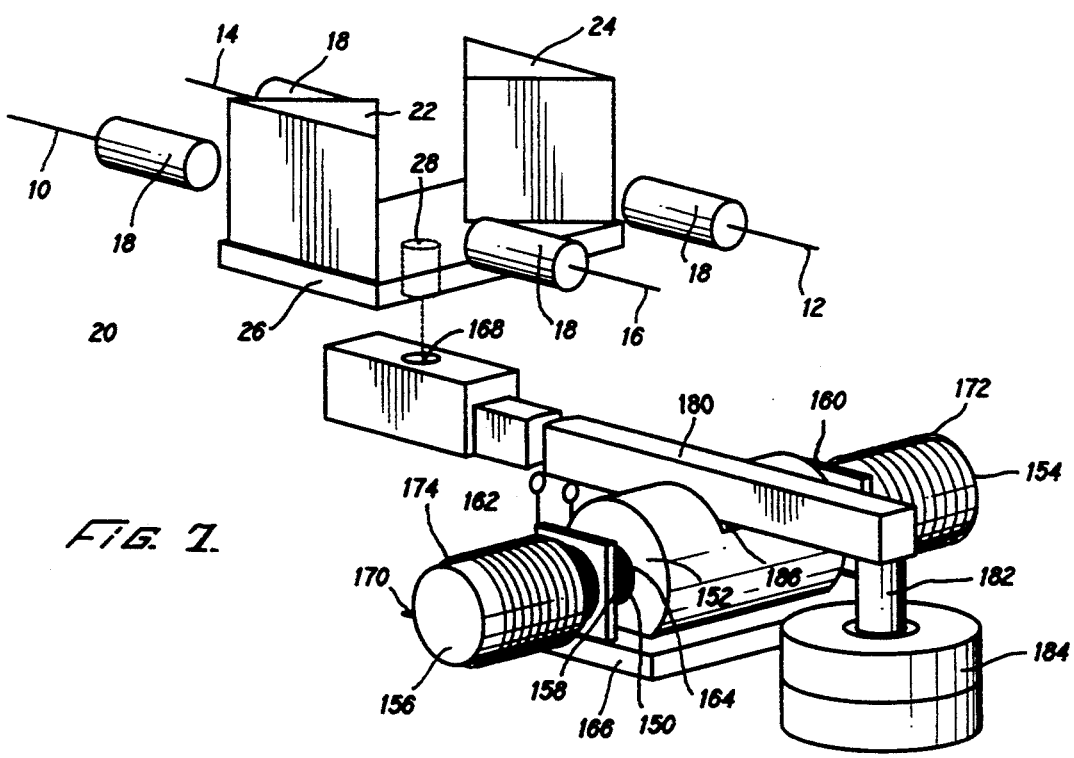

APPARATUS FOR SWITCHING OPTICAL SIGNALS AMONG OPTICAL FIBERS AND METHOD

BACKGROUND OF THE INVENTION

1. Field of the Invention

This invention relates generally to a fiber optic switch, and more particularly concerns a two-by-two fiber optic switch for use in Local Area Network (LAN) applications using an optical fiber dual ring system.

2. Description of the Prior Art

Modern Local Area Networks are experiencing increasing data transmission rates. The electrical signals traditionally used (either digital or analog) in LANs cannot satisfy the increased data transmission rates. Because of this, LANs are increasingly being constructed with optical fiber instead of more traditional electrical cables. Optical fiber cable is ideal for use in LANs because they can carry much larger quantities of data than traditional cable. Also, optical fiber cable does not create the electromagnetic interference (EMI) associated with electrical cable used in a LAN.

These optical fiber cables are connected by fiber optic switches. An optical fiber switch is used to change the optical path to allow transmission of data into the LAN, reception of data by a terminal from the LAN, or allow transmission of data around the LAN and the local (where data is transmitted between a transmission location to a receiving location), respectively.

By switching the optical switch between the inserted state (where data is either inserted or retrieved from the information ring) and bypass state (where data is transmitted inside the information ring), the two-by-two switch can change the optical path in the LAN. Optical signals from the information ring can also be isolated while the continuity of the information ring is maintained.

Any de facto industrial standard known as fiber data distributed interface (FDDI) has developed that outlines basic requirements for fiber optic switches.

In optical fiber switches, either multi-mode fiber or single-mode fiber can be used. Regardless of what type of fiber is used, it has always been very difficult to align optical paths when bare fiber is used. Because fiber cores are so small, a misalignment of a few micrometers can cause large insertion losses. This is especially true when using single-mode fiber.

This misalignment problem has been addressed to some extent in the prior art through the use of a Grade Refractive Index (GRIN) lens. The GRIN lens makes the fiber act as if its core diameter has been enlarged to the size of the GRIN lens diameter, thereby making the fiber core diameter behave as if it was at least ten to one-hundred times larger. As a result insertion losses will be minimized when there is a few micrometers of misalignment between the light path from the input fiber to the output fiber. Inherent misalignments cannot be corrected thought the use of a GRIN lens.

Currently, there are two different technologies used to make optical fiber switches (exclusive of the integrated optic switch). A first is known as moving fiber. In this technology either the input optical fibers or the output optical fibers are actually reoriented to switch the light path between outputs. The second is known as moving prism or mirror. in this technology the refractive medium, i.e. the prism, or the mirror is reoriented to switch the light path between outputs while the fibers do not move. These prior art technologies, however, have suffered from slow switching speeds, unacceptable insertion losses and low stability (e.g. alignment problems).

An example of an optical system that uses a moving reflector assembly is disclosed in co-pending application, U.S. Ser. No. 08/028,398, filed of even date by the same inventor as this application. It is hereby incorporated by reference in its entirety.

SUMMARY OF THE INVENTION

The present invention overcomes the problems and disadvantages of the prior art through the use of unique arrangements of high quality reflective surfaces and optical fibers. After the light signal leaves the input fiber, it is beamed directly, i.e., it does not pass through a refractive medium (other than air) before entering the output fiber. Also, the input and output fibers of the present invention are arranged such that both the reflected and unreflected light beams from the input fibers will be aligned with at least one output fiber. This eliminates to a large extent all losses and inherent stability problem associated with the current fiber optic switches.

A mechanism and reflector assembly of the invention switches the light path between fixed fibers, e.g., one input fiber and two output fibers or two input fibers and two output fibers, etc. The reflector assembly in one embodiment preferably comprises two triangular shaped mirrors and is mounted on a electromagnetically driven cylinder. With current applied to the mechanism the cylinder is linearly pushed or pulled to desired locations demarked for example by a stopper assembly. Because of the manner of mounting the reflector assembly on the cylinder, it moves as the cylinder moves.

When current is applied in one direction the cylinder is driven to a first position. In this position the reflectors interrupt the light path and cause the light signals to be transmitted to the desired output fiber. When current is applied in the opposite direction, the cylinder and hence the reflector assembly is moved to a second position. In this second position, the reflector assembly is moved out of the light path, allowing the light signal to be transmitted unimpeded to the output fiber optically aligned with the input fiber. Depending on the size, shape and position of the reflector assembly, any fiber can be "switched" to optically connect it to any other fiber without the need to pass the light through a refractive medium.

In another embodiment of the invention, the reflector assembly is rotatably pushed or pulled to desired location. An armature which is pivotably supported connects the reflector assembly to the cylinder generating rotational movement. The armature is disposed in a pivot formed on the cylinder. Movement of the cylinder causes the armature to move as well, which in turn causes the reflector assembly to follow a circular arc. In this embodiment the reflector assembly preferably comprises a first triangular mirror and a second triangular mirror. The "switching" of the light paths of this rotary embodiment can be accomplished in essentially the same way as in the linear embodiment. The main difference is the manner of movement of the reflector assembly. In the linear embodiment, the reflector assembly, as discussed above, is positioned through linear movement. In the rotary embodiment, the reflector assembly is positioned through rotary movement.

In a another embodiment of the invention, a biasing force can be added with the basic configuration being similar to the linear embodiment. The biasing force acts to hold the cylinder in a "home" position when no current is applied. When current is applied, the biasing force is overcome and the cylinder, and hence the reflector assembly, is moved from its "home" or first position to a second position. When current is removed, the biasing force moves the cylinder and hence the reflector assembly back to the "home" or first position without the need to apply current in the appropriate direction.

In yet another embodiment of the invention, torsional biasing force has been added to a structure similar to that of the rotary embodiment. The torsional biasing force holds the cylinder in a first position when no current is applied to the system. In the rotary embodiment, the reflector assembly is rotatably mounted. Hence, when the cylinder is in its first position, the reflector assembly is also in its first position. When current is applied, the cylinder is driven to the second position. When the magnetic cylinder has been moved, the armature mounted thereon moves the reflector assembly in a circular fashion from its first (or initial) position to a second position. When the current is removed from the coil, the torsional biasing force moves the cylinder and hence the reflector assembly back to the first position.

A feature of one aspect of the present invention, therefore, is the provision of a fiber optic switch comprising an input fiber, a first output fiber and a second output fiber. The first input fiber is arranged so that it is collinear with the second output fiber and adjacent and parallel the first output fiber. When the reflector assembly is moved the light emanating from the input fiber may be redirected from one output to the other output without the light beam passing through a refractive medium.

In one application, the invention may be incorporated in a two-by-two fiber optic switch. In this application the switch comprises a moving means for moving the reflector assembly to a first position or a second position. If appropriate GRIN lens can be placed at the end of each fiber. When the reflector assembly is between the first input fiber and the second input fiber, it is in the first position. When the reflector assembly is in the first position, a light signal transmitted from the first input fiber, through the GRIN lens (if used) on the first input fiber is reflected to the GRIN lens (if used) on the first output fiber. When the reflector assembly is in the second position, a light signal transmitted from the first output fiber travels directly to the GRIN lens (if used) on the second output fiber, thereby travelling unreflected by the reflector assembly.

The above and other features of the invention, including various novel details of construction and combination of parts, will now be more particularly described with reference to the accompanying drawings and pointed out in the claims. It will be understood that the particular device embodying the invention are shown by way of illustration only and not as limitations of the invention. The principles and features of this invention may be employed in various and numerous embodiments without departing from the free spirit of the invention.

BRIEF DESCRIPTION OF THE DRAWINGS

Reference is made to the accompanying drawings in which are shown illustrative embodiments of aspects of the invention, from which novel features and advantages will be apparent.

FIG. 6 is a view of an embodiment of a bypass switch made in accordance with aspects of the invention.

FIG. 7 is a view of an embodiment of a bypass switch made in accordance with aspects of the invention.

DETAILED DESCRIPTION OF THE DRAWINGS

Figure 1:
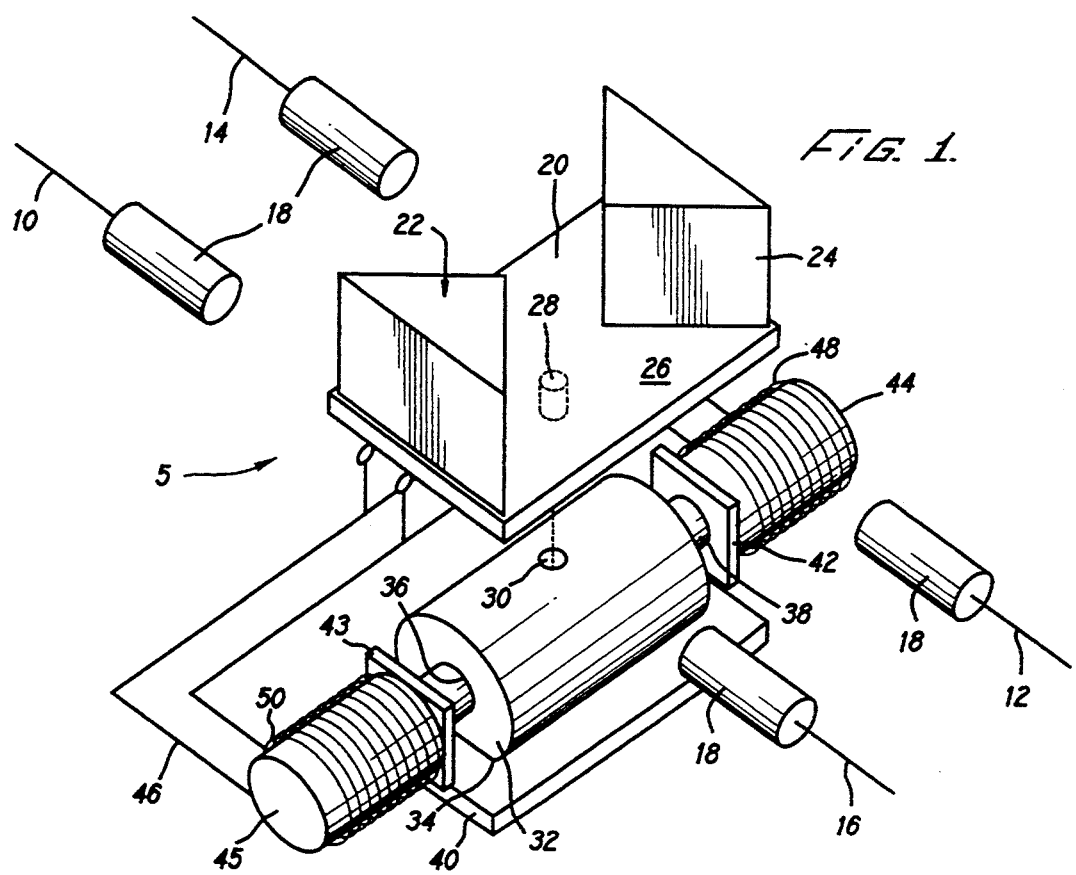
FIG. 1 is a perspective view of an embodiment of a two-by-two fiber optic switch incorporating aspects of the invention.

Referring to the drawings, and in particular, FIG. 1, there is shown a first embodiment of a two-by-two fiber optic switch 5 incorporating aspects of the invention. The switch 5 has four optical fibers, a first input fiber 10, a second input fiber 12, a first output fiber 14 and a second output fiber 16. Each fiber is in a fixed position. Placed in front of each fiber is a one-quarter pitch Grade Refractive Index (GRIN) lens 18. The purpose of the GRIN lens 18 is to collimate light for example from the first input fiber 10 and second input fiber 12, produce parallel light beams, and focus the parallel light beam into the first output fiber 14 and second output fiber 16.

The first input fiber 10 is placed opposite the second output fiber 16 while the second input fiber 12 is placed opposite the first output fiber 16. As is apparent from the drawing, the first input fiber 10 is located adjacent the first output fiber 14 while the second input fiber 12 is located adjacent the second output fiber 16. Disposed between the opposing fibers (first input fiber 10 and first output fiber 14 oppose second input fiber 12 and second output fiber 16) is a reflector assembly 20. The reflector assembly 20 comprises a first mirror 22, a second mirror 24 and a base 26. The first mirror 22 and second mirror 24 are affixed to base 26. In the preferred embodiment, both the first mirror 22 and the second mirror 24 have triangular shapes. When the reflector assembly 20 is in the light path, as will be described, the first mirror 22 is located between first input fiber 10 and second output fiber 16 while second mirror 24 is located between second input fiber 12 and first output fiber 14.

The first mirror 22 and second mirror 24 are preferably front surface mirror types that are coated with high reflectivity material such as silver or gold. The base 26 is preferably made of a non-magnetic material such as aluminum or stainless steel. There is a holding bar 28 located underneath base 26. The holding bar 28 is used to mount the reflector assembly 20 into a mounting hole 30 located on the top of a magnetic cylinder 32.

The magnetic cylinder 32 has a flat bottom surface 34 and a lumen 36 running its length. It is constructed using a permanent magnetic material. A non-magnetic bar 38 which is longer than the magnetic cylinder 32 runs through the lumen 36. The bar 38 holds the magnetic cylinder 32 in place and functions as its track. Disposed beneath the magnetic cylinder 32 is a non-magnetic platform 40 which is used as a guide. The combination of guide platform 40 and bar 38 keeps any movement of the magnetic cylinder's 32 linear. Additionally, there is a first non-magnetic stopper 42 and second non-magnetic stopper 43 disposed at either end of bar 38. The first stopper 42 and second stopper 43 control the precise position of the magnetic cylinder 32.

Located behind the first stopper 42 is a first soft iron 44. Located behind second stopper 43 is a second soft iron 45. both the first soft iron 44 and second soft iron 45 are wrapped with wire 46 such that a first coil 48 and a second coil 50 are formed. When the wire 46 is energized with electrical current, the first coil 48 and second coil 50 cause the first soft iron 44 and second soft iron 45 to become magnetized. When the electrical current goes through wire 46 in one direction, the current magnetizes the first soft iron 44 and second soft iron 45 such that the magnetic cylinder 32 moves in one direction or another.

The motion is such that the magnetic cylinder 32 rests against either first stopper 42 or second stopper 43. The polarity of the magnetic field created at the first soft iron 44 and second iron 45 depends upon the direction the wire 46 is wound around first soft iron 44 and second soft iron 45. The wire 46 is wound such that first coil 48 and second coil 50 are wound in separate directions (either clockwise or counterclockwise). This opposite winding causes opposite magnetic polarization at the first soft iron 44 and second soft iron 45.

The purpose of the first stopper 42 and second stopper 43 is to precisely position the magnetic cylinder 32. Because bar 38 is longer than magnetic cylinder 32, the magnetic cylinder 32, as discussed above, can move along bar 38. The magnetic cylinder 32 stops when it hits either the first stopper 42 or the second stopper 43, thereby performing the magnetic cylinder 32 positioning function.

Figure 8A:
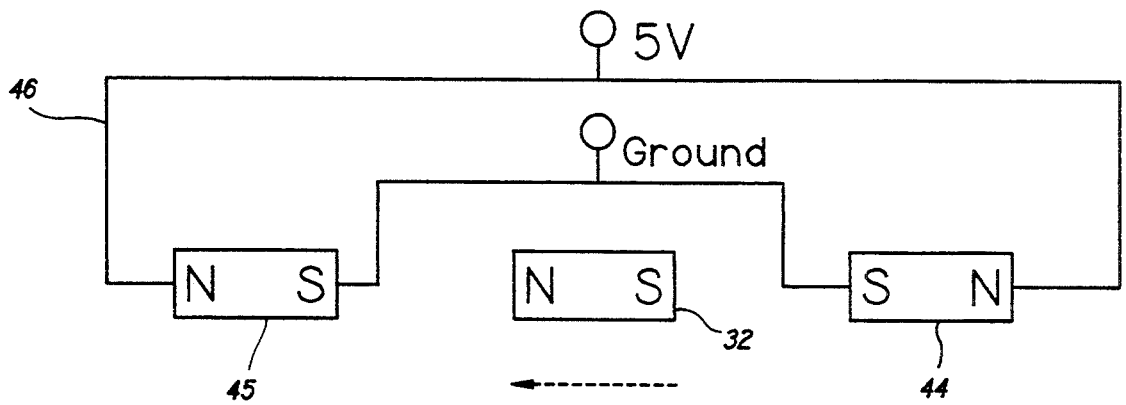
FIG. 8a is a schematic diagram of the electric circuit used to energize the two-by-two fiber optic switch of FIGS. 1 and 2.
Figure 8B:
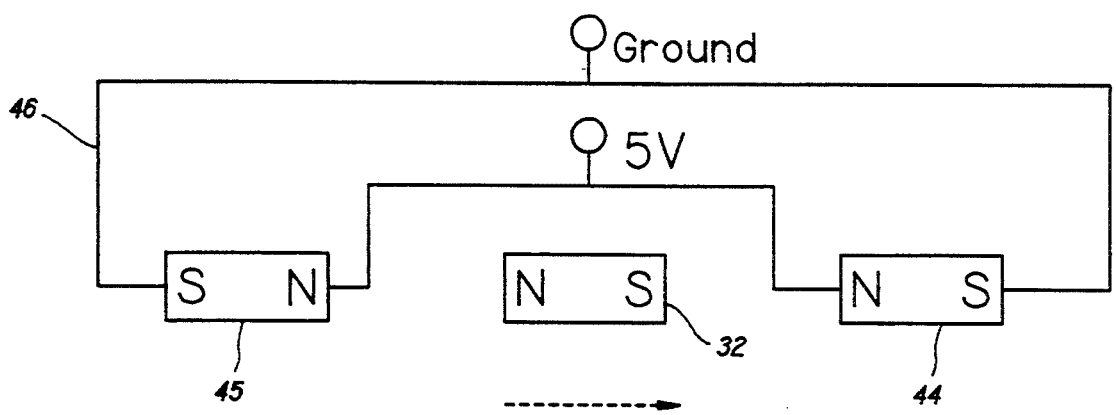
FIG. 8b is a schematic diagram of an electric circuit is used to energize the two-by-two fiber optic switch of FIGS. 1 and 2.

Thus, the magnetic field created by first soft iron 44 and second soft iron 45 causes magnetic cylinder 32 to move between first stopper 42 and second stopper 43 when the opposite electrical current polarity is applied. The effect of varying the current direction in copper wire 46 is schematically shown in FIGS. 8.1 and 8.2, and will be discussed below.

Because the reflector assembly 20 is mounted on the magnetic cylinder 32, any movement by the magnetic cylinder 32 will cause the reflector assembly 20 to move, thereby changing the location of the first mirror 22 and second mirror 24. By moving the reflector assembly 20, the light signals emerging from the first input fiber 10 and second input fiber 12 change path.

Figure 3:
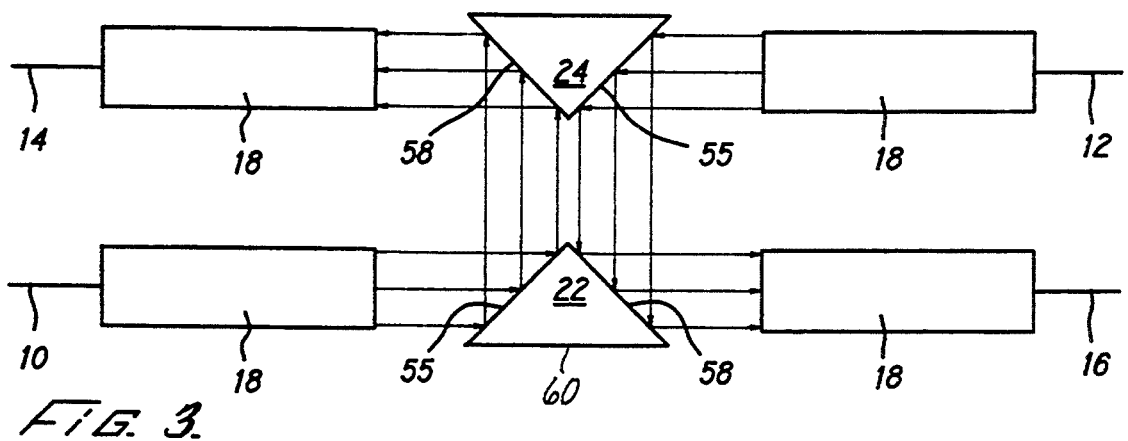
FIG. 3 is a top view of the reflector assembly and optical fibers of FIG. 1 showing optical light paths when a first embodiment of the invention is in a first position.

The paths of the light signals in the embodiment of the invention shown in FIG. 1 will now be discussed. FIG. 3 shows the light path of the invention when the reflector assembly is in its first position. In order to achieve the light path shown in FIG. 3, current may be applied to copper wire 46 such that magnetic cylinder 32 is attracted to first stopper 42. Because the reflector assembly 20 is mounted on the magnetic cylinder 32, it moves to its first position.

As discussed above, first mirror 22 and second mirror 24 are front surface mirrors. Both the first mirror 22 and the second mirror 24 have a first mirror surface 55 and a second mirror surface 58. First mirror surface 55 on the first mirror 22 is located in front of the first input fiber 10 when the reflector assembly is in its first position. First mirror surface 55 on the second mirror 24 is located in front of the second input fiber 12 when the reflector assembly 20 is in its first position.

Second mirror surface 58 is formed at a right angle (e.g., ninety degrees) to the first mirror surface 55. A third surface 60 can be connected to the first mirror surface 55 and the second mirror surface 58 such that both the first mirror 22 and second mirror 24 form an isosceles right-triangle. When the reflector assembly 20 is in its first position, second mirror surface 58 on the first mirror 22 is located in front of second output fiber 16. Second mirror surface 58 on the second mirror 24 is located in front of first output fiber 14 when the reflector assembly 20 is in its first position.

When the reflector assembly is in its first position, the first input fiber 10 transmits a parallel light signal through GRIN 18 that is incident on first mirror surface 55 of first mirror 22. Because of the angle in which first mirror surface 55 is disposed (preferably forty-five degrees with respect to the light signal), the parallel light signal bounces off of first mirror surface 55 and is transmitted to second mirror surface 58 of second mirror 24. The second mirror surface 58 of second mirror 24 is disposed such that the parallel light signal is then transmitted to the GRIN lens 18 on first output fiber 14, thereby completing a light path through the switch 5.

Additionally, when reflector assembly 20 is in its first position, the second input fiber 12 transmits a parallel light signal that is incident upon first mirror surface 55 of the second mirror 24. Because of the angle in which first mirror surface 55 is disposed, the parallel light signal bounces off first mirror surface 55 and is transmitted to second mirror surface 58 of first mirror 22. The second mirror surface 58 of first mirror 22 is disposed such that the parallel light signal is then transmitted to the GRIN lens 18 on second output fiber 16, thereby completing another light path through the switch 5.

Preferably the coating has a reflectivity of 97% or better. Because of the high reflectivity coating of first mirror 22 and second mirror 24, the insertion loss of the 5 mirrors' 22, 24 reflection is very small (<0.1 dB from each reflection, based upon a normal reflectivity of ninety-nine percent).

The first mirror 22 and second mirror 24, as discussed above, are preferably formed as isosceles-right triangles. Because first mirror 22 and second mirror 24 are isosceles-right triangles, for proper operation the first input fiber 10 and first output fiber 14 will always be parallel to each other and the second input fiber 12 and second output fiber 14 will always be parallel to each other as well.

Additionally, in this configuration it is important that first input fiber 10 be collinear with second output fiber 16 and that second input fiber 12 be collinear with first output fiber 14. Arranging these fibers so that they are collinear makes it exceedingly simple to align the fibers 10, 12, 14, 16 and the mirrors 22, 24 properly. Even if the reflector assembly becomes slightly displaced from its first and second position the light path will remain aligned. Therefore, this embodiment of the invention is a very stable.

Figure 4:
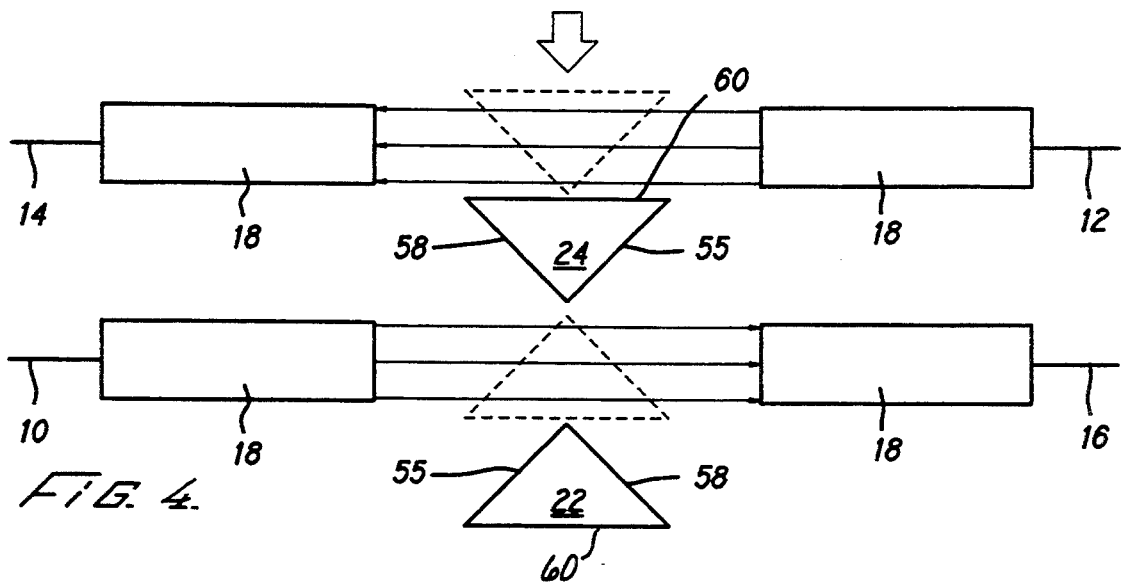
FIG. 4 is a top view of the reflector assembly and optical fibers of FIG. 1 showing alternate optical light paths.

FIG. 4, shows the available light paths of the switch when the reflector assembly 20 is moved to a second position. When the reflector assembly 20 is in its second position, the first mirror 22 and second mirror 24 move such that the light paths are no longer interrupted by the first mirror 22 or second mirror 24. The available light paths are therefore from the first input fiber 10 to the second output fiber 16 and from the second input fiber 12 to the first output fiber 14. As discussed above, the first input fiber 10 is collinear with the second input fiber 16 while the second input fiber 12 is collinear with the first output fiber 14. Therefore, when the first mirror 22 and second mirror 24 move away from the light paths, the first output fiber 14 and second output fiber 16 will receive the light signals transmitted from second input fiber 12 and first input fiber 10, respectively.

The first input fiber 10 and the first output fiber 14 are placed such that there is a distance between them. The same is true for the second input fiber 12 and first output fiber 14. The preferable distance selected is the minimum distance that will allow the first mirror 22 and the second mirror 24 to be situated between the light signals transmitted by the input fibers 10, 12 without causing any reflection when the reflector assembly is in the second position. The reflector assembly 20 therefore only needs to move a small distance in order to "switch" the light path, thereby sending the light signal to a different output.

As discussed above, the reflector assembly 20 may be mounted on the magnetic cylinder 32. Electric current applied to the copper wire 36 in one direction results the first magnetic coil 48 and second magnetic coil 50 creating a magnetic field of a certain polarity. This magnetic field will cause the magnetic cylinder 32 to move against either the first stopper 42 or the second stopper 43. When the magnetic cylinder 32 is moved to a first position, it carries the reflector assembly 20 such that the first mirror 22 and second mirror 24 are in the light path. This causes the light signal to be reflected. When the magnetic cylinder 32 is moved to a second position, it carries the reflector assembly 20 out of the light path, thereby resulting in no light signal reflection. Since the distance reflector assembly 20 moves is very short, the combination of the reflector assembly 20 and the moving magnetic cylinder 32 result in a two-by-two fiber optic switch with very fast switching speed.

Figure 2:
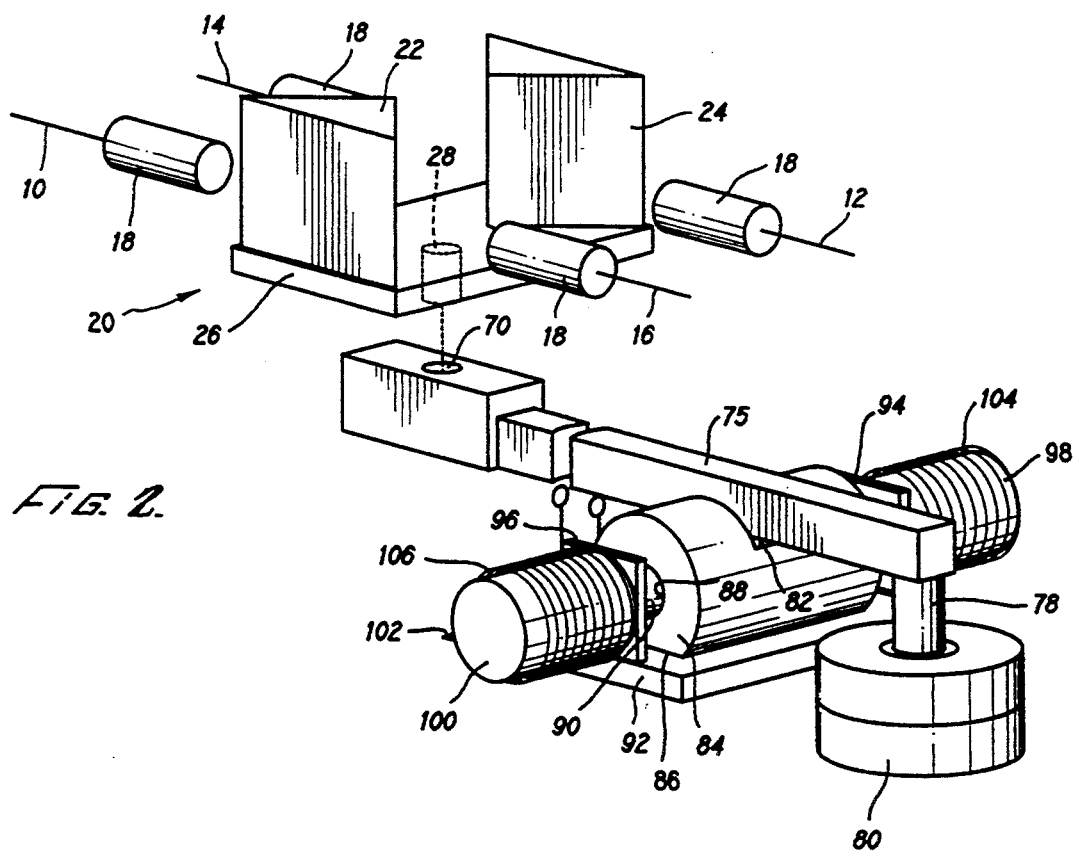
FIG. 2 is a perspective view of an alternative embodiment of a two-by-two fiber optic switch incorporating aspects of the invention.

A second embodiment of the invention is shown in FIG. 2. This embodiment can comprise the same reflector assembly 20 as the first embodiment, but uses an alternative means of moving it. As with the first embodiment, this embodiment uses the same system of first input fiber 10, second input fiber 12, first output fiber 14 and second output fiber 16. Additionally, GRIN lenses 18 are preferably placed in front of each fiber.

The plate 26 of the reflector assembly 20 is mounted on armature 75 by placing holding bar 28 into hole 70. The hole is located at a first end of the armature 75. The armature 75 is mounted on pivot bar 78 at its second end. The pivot bar 78 is placed such that it is rotatably mounted into ball bearings 80. Armature 75, therefore, acts as a lever that moves the reflector assembly 20.

Figure 15:
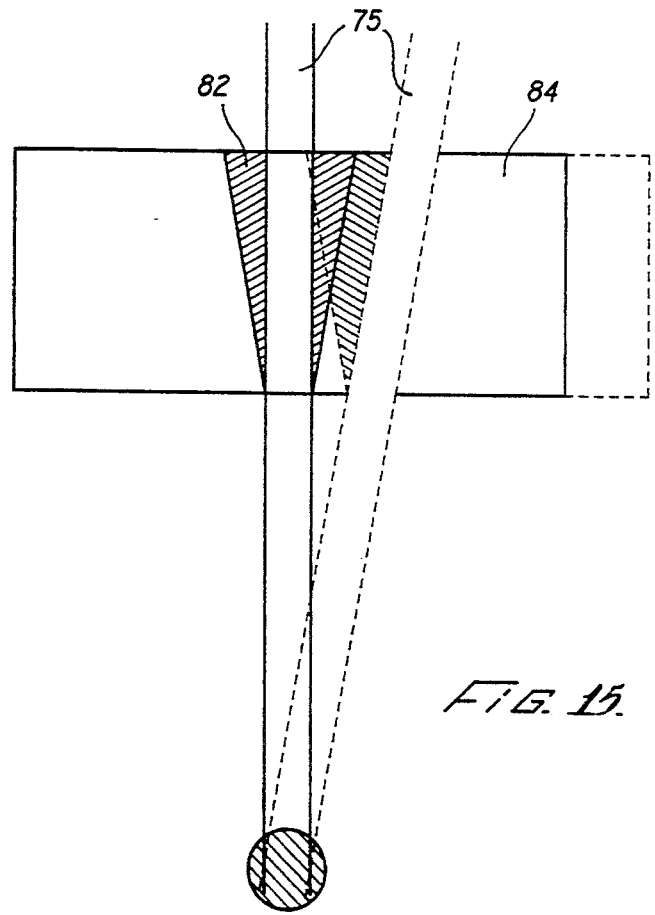
FIG. 15 is a top view of a pivot used to move an armature.
Figure 16:
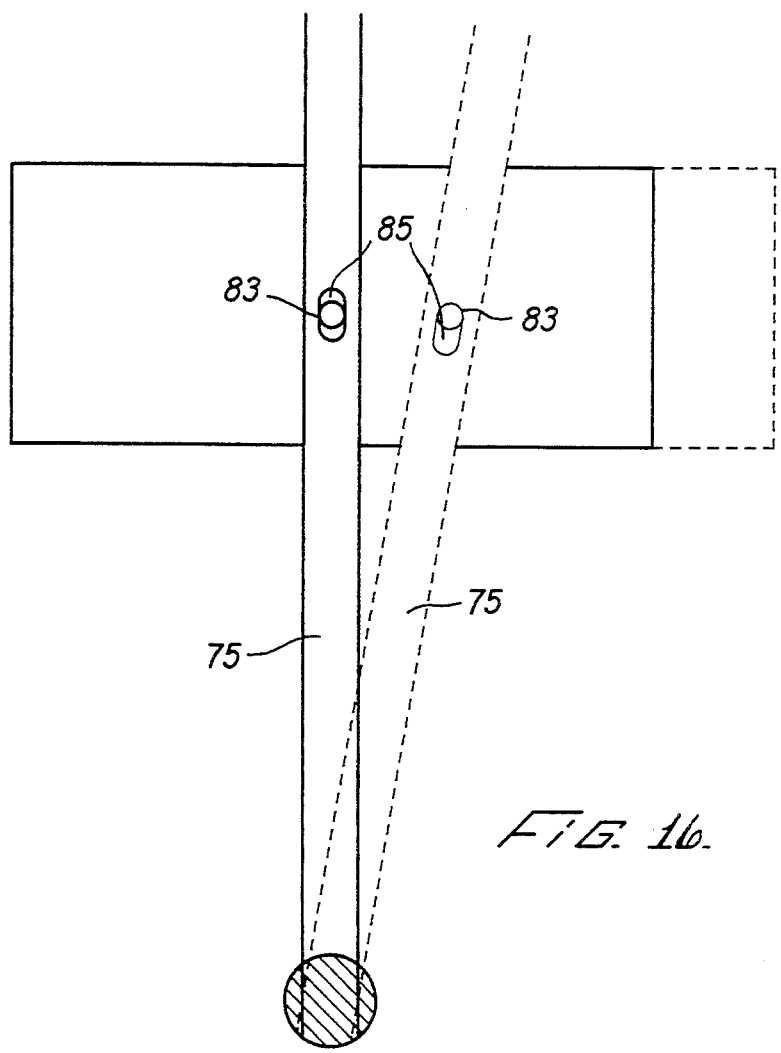
FIG. 16 is a top view of an alternative embodiment of a pivot used to move an armature.

The means of moving the armature 75, and therefore moving the reflector assembly 20 is similar to the means employed in the first embodiment. The armature 75 is mounted on the magnetic cylinder 84 such that any movement of the magnetic cylinder 84 will move the armature 75. Two examples of armature 75 mounting are shown in FIGS. 15 and 16. In FIG. 15, a slot 82 is formed on the magnetic cylinder 84. This slot 82 is formed in a V-shape such that any magnetic cylinder 84 movement can move the armature 75. FIG. 16 shows another pivot. In FIG. 16, a pivot pin 83 is formed on the magnetic cylinder 84. The armature 75 has a pivot opening 85 formed within it where the pivot pin 83 is inserted. This allows the magnetic cylinder 84 to move armature 75, thereby moving the reflector assembly 20.

The magnetic cylinder 84 has a flat bottom surface 86 and a lumen 88 running through its length. As in the first embodiment, It is constructed using a permanent magnetic material. A non-magnetic bar 90 which is longer than the magnetic cylinder 84 runs through the lumen 88. The bar 90 holds the magnetic cylinder 84 in place and functions as its track. Disposed beneath the magnetic cylinder 84 is a non-magnetic platform 92 which is used as a guide. The combination of guide platform 92 and bar 90 keeps any magnetic cylinder 84 movement linear. Also as in the first embodiment, there is a first non-magnetic stopper 94 and second non-magnetic stopper 96 disposed at either end of bar 90. The first stopper 94 and second stopper 96 control the precise position of the magnetic cylinder 84.

As in the first embodiment, there is a first soft iron 98 located behind the first stopper 94. Located behind second stopper 96 is a second soft iron 100. Both the first soft iron 98 and second soft iron 100 are wrapped with wire 102 such that a first coil 104 and a second coil 106 are formed. When the wire 102 is energized with electrical current, the first coil 104 and second coil 106 cause the first soft iron 98 and second soft iron 100 to become magnetized. When the electrical current goes through wire 102 in one direction, the current magnetizes the first soft iron 98 and second soft iron 100 such that the magnetic cylinder 84 moves in one direction or another.

The motion is such that the magnetic cylinder 84 ends up resting against either first stopper 94 or second stopper 96. The polarity of the magnetic field created at the first soft iron 98 and second soft iron 100 depends upon the direction the wire 102 is wound around first soft iron 98 and second soft iron 100. The wire 102 is wound such that first coil 104 and second coil 106 are wound in opposite directions (either clockwise or counterclockwise). This opposite winding causes opposite magnetic polarization of the first soft iron 98 and second soft iron 100.

As mentioned, the purpose of the first stopper 94 and second stopper 96 is to precisely position the magnetic cylinder 84. Because bar 90 is longer than magnetic cylinder 84, the magnetic cylinder 84, as discussed above, can move along bar 90. The magnetic cylinder 84 stops when it hits either the first stopper 94 or the second stopper 96, thereby performing the magnetic cylinder 84 positioning function. Alternatively the pivot opening 85 or the slot 82 can be used as the means for positioning.

Thus, the magnetic field created by first soft iron 98 and second soft iron 100 causes magnetic cylinder 84 to move between first stopper 94 and second stopper 96 when the opposite electrical current polarity is applied. The effect of varying the current direction in copper wire 102 is shown in FIGS. 8.1 and 8.2 and will be discussed below.

When the magnetic cylinder 84 moves, it pushes the armature 75 in a circular arc. The movement of the armature 75 is in the same direction as the magnetic cylinder 84. Since armature 75 acts as a lever, it moves in a circular arc with a center at ball bearings 80. Because the armature 75 moves in a circular arc, the reflector assembly 20 also moves in a circular arc.

Figure 5:
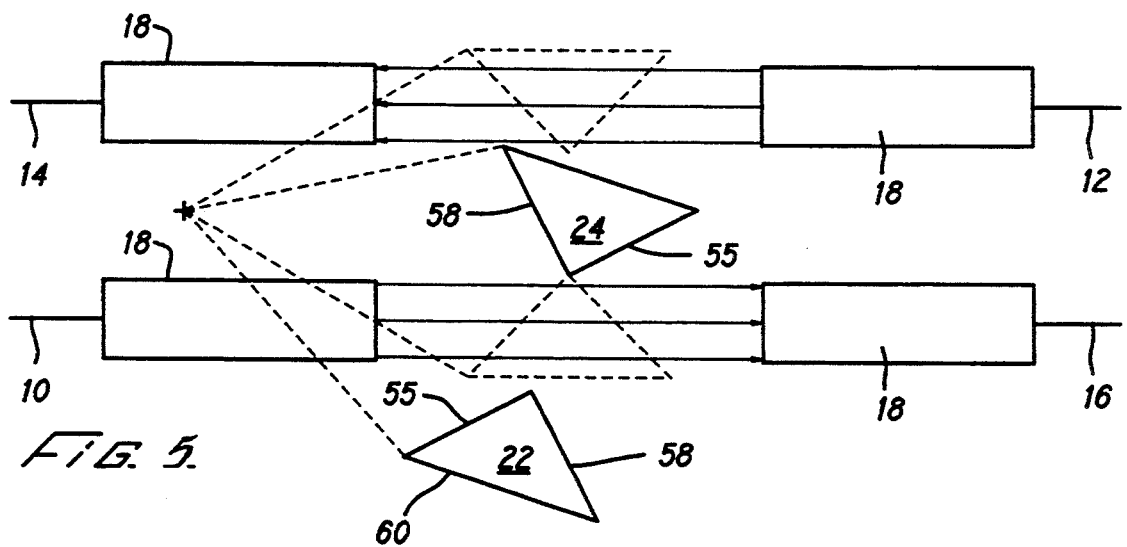
FIG. 5 is a top view of the reflector assembly and optical fibers of FIG. 2 showing optical light paths.

FIG. 5 shows the light path change when using the embodiment of FIG. 2. As discussed, the reflector assembly 20 has a first mirror 22 and a second mirror 24 mounted on a base 26. Both the first mirror 22 and second mirror 24 are shaped as isosceles right-triangles and have a first mirror surface 55, a second mirror surface 58 and a third surface 60 (if desired) that connects between the first mirror surface 55 and second mirror surface 58. When the armature 75 swings the reflector assembly 20 to a first position, the first mirror 22 and second mirror 24 are placed such that they are in the light path created by the first input fiber 10, second input fiber 12, first output fiber 14 and second output fiber 16.

When the reflector assembly is in the first position, the light path of a light signal emerging from the first input fiber 10 is as follows. The light signal is transmitted by the first input fiber 10 such that it is reflected off first mirror surface 55 of first mirror 22. The reflected light signal then bounces off of the second mirror surface 58 of second mirror 24 such that it is transmitted to first output fiber 14. The light path of a light signal transmitted by second output fiber 12 is similar. The light signal is transmitted by the second input fiber 12 such that it is reflected off first mirror surface 55 of second mirror 24. The reflected light signal then bounces off of the second mirror surface 58 of first mirror 22 such that it is transmitted to second output fiber 16.

When the magnetic cylinder 84 is moved to its second position, it moves the armature 75 such that reflector assembly 20 moves to its second position. In the reflector assembly's 20 second position, the first mirror 22 and second mirror 24 move such that they are no longer in the light path, thereby creating a situation where no reflection takes place. Therefore, the light signals transmitted by first input fiber 10 and second input fiber 12 are transmitted directly to second output fiber 16 and first output fiber 14, respectively.

As in the embodiment of FIG. 1, the embodiment of FIG. 2 is constructed so that the switching between the first position (where there is a reflected light path) and the second position (where there is no reflection in the light path) is very fast. Fast switching speeds are accomplished, as discussed above, by keeping the distance between adjacent fibers (first input fiber 10 and first output fiber 14 are adjacent, as are second input fiber 12 and second output fiber 16) as small as possible. This distance is selected such that one of either the first mirror 22 or second mirror 24 can fit between the light path such that the light path is transmitted without obstruction. Since the mirrors only need to be about as wide as the light beam to be able to reflect it, the distance can be very small. By making this distance small, the reflector assembly 20 need only be moved a short distance by the magnetic cylinder 20. This allows for very fast switching speeds.

Also as in the embodiment of FIG. 1, the embodiment of FIG. 2 is constructed so that the switch has very high stability. High stability is obtained by keeping first input fiber 10 and second output fiber 16 as well as the second input fiber 12 and the first output fiber 14 collinear. This will allow the light signals that are transmitted from the first input fiber 10 and second input fiber 12 to be aligned with the first output fiber 14 and second output fiber 16. This is true whether the reflector assembly 20 is in its first position or second position.

When the reflector assembly 20 is in the first position, thereby causing the reflected light path described above, the collinear input and output fibers, in conjunction with the isosceles right-triangle shaped first mirror 22 and second mirror 24 result in a switch with inherently high stability. This results in the light signal of the first input fiber 10 and second input fiber 12 striking the first mirror surface 55 at a forty-five degree angle. Because of this, the light signal reflects off the first mirror surface 55 at a ninety degree angle from its original path. The reflected light signal then strikes the second mirror surface 58 at forty-five degree angle as well. The light signal then reflects off the second mirror surface 58 at a ninety degree angle, thereby transmitting the light signal to the output fiber 14, 16. Thus, the right-triangular shape of the first mirror 22 and second mirror 24 result in the light signals being accurately reflected to the output fibers 14, 16.

Front coating the first mirror 22 and the second mirror 24 allows for high stability, even when the reflector assembly 20 becomes slightly misaligned. As discussed above, the first mirror 22 and second mirror 24 are coated on the first surface 55 and second surface 58. Coating the surfaces allows the light signals to reflect directly off the surface of the mirror, thereby maintaining the angles of reflection discussed above. If the mirrors are not coated on the surface, the light signal will have to pass through glass (or any other mirror substrate chosen) before reaching the mirror surface. In the situation when the light signal passes through the glass, refraction will occur that will cause the angles of reflection to deviate from those discussed above, thereby increasing losses and decreasing stability when the reflector assembly 20 becomes slightly misaligned.

FIG. 6 shows a alternative embodiment of the invention. The embodiment of FIG. 6 is similar to the embodiment of FIG. 1. The main difference between the embodiment of FIG. 1 and FIG. 6 is the addition of a biasing means. In this case a spring 120 is placed between magnetic cylinder 122 and second soft iron 126 such that it surrounds bar 128 to create a biasing force. There is no spring, however, between magnetic cylinder 122 and the first soft iron 124. The spring 120 is placed around bar 128 such that it passes through the second stopper 132.

The operation of this embodiment is similar to that of FIG. 1. As in the FIG. 1 embodiment, the magnetic cylinder 122 has a lumen 136 disposed therethrough. The bar 128 runs through the lumen 136 and functions, in conjunction with guide plate 144, as a guide for magnetic cylinder 122. The reflector assembly 20 is mounted on the magnetic cylinder 122 via holding bar 28. Holding bar is inserted into mounting hole 138. When no current is applied to wire 134, the spring 120 biases the magnetic cylinder 122 such that it rests against first stopper 130. No electric current is necessary in order to place or keep the reflector assembly 20 in the first position.

As above, when the reflector assembly 20 is in the first position, the first mirror 22 and second mirror 24 will be in the light path, thereby causing the light signal from first input fiber 10 to be transmitted to first output fiber 14 and the light signal from second input fiber 12 to be transmitted to second output fiber 16.

When copper wire 134 has current running through it, the first soft irons 124 and second soft iron 126 will become magnetized by the first copper coil 140 and second copper coil 142, respectively. The magnetic field created by the first soft iron 124 and second soft iron 126 is such that it will pull the magnetic cylinder 122 toward the second soft iron 126, thereby overcoming the force created by spring 120. The magnetic cylinder 122 will eventually rest upon the second stopper 130. Because the reflector assembly 20 is mounted on the magnetic cylinder 122, it will move to its second position. When the reflector assembly 20 is in the second position, the light path will be unobstructed by the first mirror 22 and second mirror 24. Therefore, the light signals of first input fiber 10 and second input fiber 12 will be transmitted directly to second output fiber 16 and first output fiber 14, respectively, without reflection.

When the electric current is removed from wire 134, the magnetic force created by first soft iron 124 and second soft iron 126 will disappear, thereby allowing the spring 120 to push the magnetic cylinder 122 back to the first position. In this embodiment, the movement of the mirrors is linear. Therefore, the light paths are illustrated by FIG. 3 and FIG. 4.

FIG. 7 shows another alternative embodiment of the invention. The embodiment of FIG. 7 is similar to the embodiment of FIG. 2. The main difference between the embodiment of FIG. 2 and FIG. 7 is the addition of a biasing means. In this case a spring 150 is placed between magnetic cylinder 152 and second soft iron 156 such that it surrounds bar 158 and generates a biasing force. There is no spring, however, between magnetic cylinder 152 and the first soft iron 154. The spring 150 is placed around bar 158 such that it passes through the second stopper 162.

The operation of this embodiment is similar to that of FIG. 2. As in the FIG. 2 embodiment, the magnetic cylinder 152 has a lumen 164 disposed therethrough. The bar 158 runs through the lumen 164 and functions, in conjunction with guide plate 166, as a guide for magnetic cylinder 152. The reflector assembly 20 is mounted on armature 180 via holding bar 28. Holding bar 28 is placed in hole 168 located at a first end of the armature 180.

In this embodiment of the invention, a pivot such as slot 186 is placed on magnetic cylinder 152. The armature 180 is placed on the pivot. Either of the pivots shown in FIGS. 15 and 16 will perform the necessary pivoting function. At the second end of armature 180 is a pivot bar 182. The pivot bar 182 is placed such that it is rotatably mounted into ball bearings 184. Therefore, any movement of the magnetic cylinder 152 will cause the armature 180 to rotate about the ball bearings 184. The reflector assembly 20, which is mounted on the armature 180, will in turn be moved because the armature 180 will be acting as a lever.

When no power is applied to wire 170, the spring 150 biases the magnetic cylinder 152 such that it rests against first stopper 160. When the magnetic cylinder 152 is biased against first stopper 160, the armature 180 is rotated, which moves reflector assembly 20 to its first position. Therefore, no electric current is necessary in order to keep the reflector assembly 20 in the first position.

As above, when the reflector assembly 20 is in the first position, the first mirror 22 and second mirror 24 will be in the light path, thereby causing the light signal from first input fiber 10 to be transmitted to first output fiber 14 and the light signal from second input fiber 12 to be transmitted to second output fiber 16.

When wire 170 has current running through it, the first soft iron 154 and second soft iron 156 is such that it will become magnetized by the first copper coil 172 and second copper coil 174, respectively. The magnetic field created by the first soft iron 154 and second soft iron 156 will pull the magnetic cylinder 152 toward the second soft iron 156, thereby overcoming the bias created by spring 150. The magnetic cylinder 152 will eventually rest against second stopper 162. This change in position occurs very quickly.

Because the reflector assembly 20 is mounted on armature 180, when magnetic cylinder 152 rests against second stopper 162, the reflector assembly 120 will have moved to its second position. When the reflector assembly 20 is in the second position, the light path will be unobstructed by the first mirror 22 and second mirror 24. Therefore, the light signals of first input fiber 10 and second input fiber 12 will be transmitted directly to second output fiber 16 and first output fiber 14, respectively, without reflection.

When the electric current is removed from wire 170, the magnetic force created by first soft iron 154 and second soft iron 156 will disappear, thereby allowing the spring 150 to push the magnetic cylinder 152 back to the first position. In this embodiment, the movement of the mirrors is a circular arc. Therefore, the light paths are illustrated by FIG. 5.

FIG. 8.1 shows the relationship between the first soft iron 44, second soft iron 45 and magnetic cylinder 32 when current is applied in wire 46 in one direction. The embodiment of FIG. 1 is used as an example. However, the relationships discussed apply for the other embodiments as well. The first soft iron 44 and second soft iron 45 are magnetized by energizing the first copper coil 48 and second copper coil 50. In soft iron 44, a polarity opposite that of the magnetic cylinder 32 is created. In second soft iron 45, a polarity the same as magnetic cylinder 32 is created. The polarities produced with the current in the direction of FIG. 8.1 are such that the magnetic cylinder 32 is pulled by second soft iron 45

(second soft iron 45 having a southern polarity facing magnetic cylinder's 32 northern polarity, thereby causing attraction) and pushed by first soft iron 44 (first soft iron 44 having a southern polarity facing magnetic cylinder's 20 southern polarity, thereby causing repulsion). This pushing and pulling moves the magnetic cylinder towards the second soft iron 45. These pushing and pulling forces are such that the magnetic cylinder 32 moves very fast.

FIG. 8.2 shows the relationship between the first soft iron 44, second soft iron 45 and magnetic cylinder 32 when current is applied in wire 46 in the opposite direction as in FIG. 8.1. The embodiment of FIG. 1 is used as an example. However, the relationships discussed apply for the other embodiments as well. The first soft iron 44 and second soft iron 45 are magnetized by energizing the first copper coil 48 and second copper coil 50. In first soft iron 44, the polarity created is the same as that of the magnetic cylinder 32. In second soft iron 45, a polarity the opposite as magnetic cylinder 32 is created. The polarities produced with the current in the direction of FIG. 8.2 are such that the magnetic cylinder 32 is pushed by second soft iron 45 (second soft iron 45 having a northern polarity facing magnetic cylinder's 32 northern polarity, thereby causing repulsion) and pulled by first soft iron 44 (first soft iron 44 having a northern polarity facing magnetic cylinder's 20 southern polarity, thereby causing attraction). This pushing and pulling moves the magnetic cylinder towards first soft iron 44.

Figure 9:
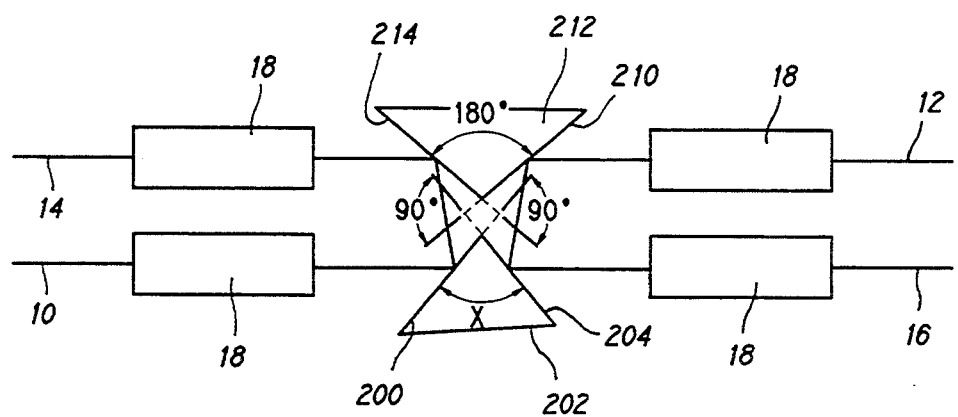
FIG. 9 is a top view of a reflector assembly and optical fibers made in accordance with aspects of the invention.

FIG. 9 shows an embodiment of the invention similar to those described above. As discussed above, the reflector assembly 20 used is the same for each of the described mechanisms. The first mirror 22 and second mirror 25 of the reflector assembly 20, however, can be replaced with mirrors having virtually infinite combinations of shapes. For example, the first mirror 22 and second mirror 24 can be replaced by the mirrors having the shape shown in FIG. 9. As discussed above, the first mirror 22 and second mirror 24 were shaped as isosceles right-triangles. Thus, first mirror surface 55 and second mirror surface were disposed at ninety degree angles.

It is possible, however, to use triangular shaped mirrors that do not dispose the first mirror surface 55 and second mirror surface 58 at ninety degree angles. The means used to determine the angle that first mirror surface 55 and second mirror surface 58 can be disposed at will now be described. The angle between first mirror surface 200 of the first mirror 202 and second mirror surface 204 of the first mirror 202 is set at X degrees. The angle between the first mirror surface 210 of second mirror 212 and second mirror surface 214 of second mirror 212 is set at one hundred-eighty minus X degrees. Therefore, as shown in FIG. 9, the angle between the second mirror surface 204 of the first mirror 202 is ninety degrees. The angle between the first mirror surface 210 of the second mirror 212 and the second mirror surface 204 of the first mirror 202 is also ninety degrees. This relationship is always true.

With the first mirror 202 and second mirror 212 being constructed according to this relationship, first input fiber 10, second input fiber 12, first output fiber 14 and second output fiber 16 are arranged in the same fashion as the other embodiments discussed. The light paths are also the same as those discussed above. As discussed above, all the mirrors use front surface mirrors with high reflectivity. The coated sides of the mirrors are used for reflection.

Figure 10:
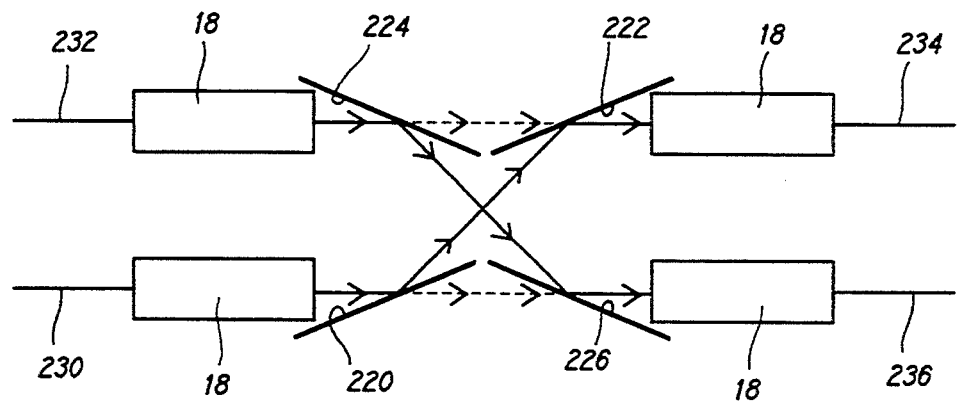
FIG. 10 is a top view of a reflector assembly and optical fiber arranged in accordance with aspects of the invention.

FIG. 10 shows an alternative embodiment of the invention. In the embodiment of FIG. 10, instead of using two triangular shaped mirrors, four separate mirrors, first mirror surface 220, second mirror surface 222, third mirror surface 224 and fourth mirror surface 226, are used. Additionally, in this embodiment, the optical fibers are relocated so that both input fibers are on the same side of the switch. First input fiber 230 and second input fiber 232 are placed such that they are collinear with second output fiber 236 and first output fiber 234, respectfully. As in the other embodiments, each mirror 220, 222, 224, 226 are front surface mirrors.

First mirror surface 220 and second mirror surface 222 are arranged such that the light signal transmitted by first input fiber 230 reflects off first mirror surface 220 to second mirror surface 222. Second mirror surface 222 then reflects the light signal to first output fiber 234. When first mirror surface 220 and second mirror surface 222 are removed from the light signal from first input fiber 230, the light signal is not reflected, and therefore travels directly to second output fiber 236. Third mirror surface 224 and fourth mirror surface 226 are arranged such that the light signal transmitted by second input fiber 232 reflects off third mirror surface 224, thereby travelling to fourth mirror surface 226. Fourth mirror surface 226 then reflects the light signal to second output fiber 236. When third mirror surface 224 and fourth mirror surface 226 are removed from the light path, the light signal is not reflected, and therefore travels directly to first output fiber 234. Note, however, that when first mirror surface 220, second mirror surface 222, third mirror surface 224 and fourth mirror surface 236 are in the light path, the light signals reflecting off first mirror surface 220 and third mirror surface 224 can intersect. This intersection could cause interference.

Figure 11:
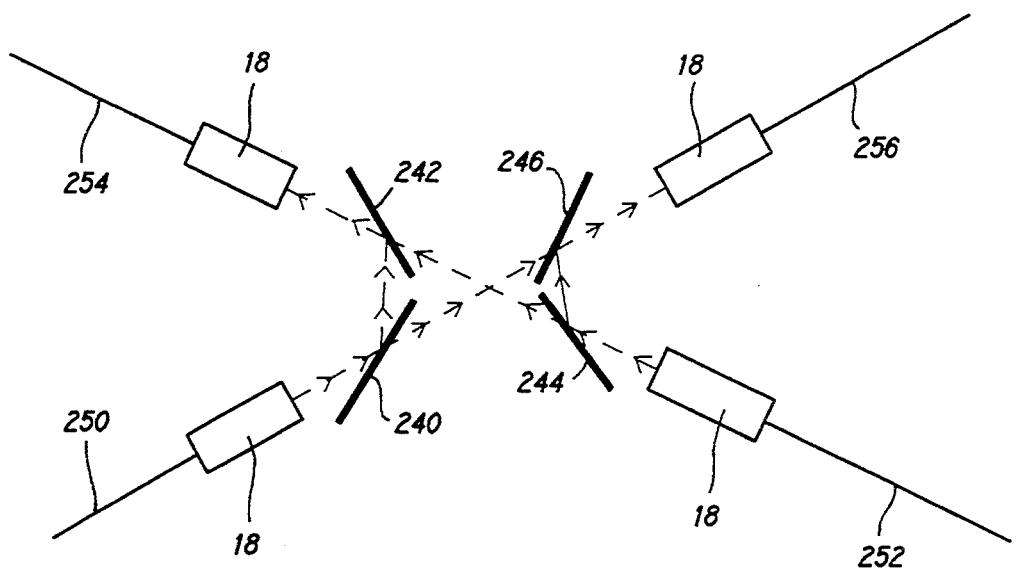
FIG. 11 is a top view of a reflector assembly and optical fiber arranged in accordance with aspects of the invention.

FIG. 11 shows yet another alternative embodiment of the invention. The first mirror 22 and second mirror 24 are replaced by first mirror 240, second mirror 242, third mirror 244 and fourth mirror 246. Additionally, the location of the optical fibers have been relocated. First input fiber 250 and first output fiber 254, while remaining adjacent, are no longer parallel to one another. The same is true for second input fiber 252 and second output fiber 254. The optical fibers are arranged, however, such that first input fiber 250 and second output fiber 256 are collinear. Second input fiber 252 is collinear with first output fiber 254. Much like prior embodiments, when the first mirror 240, second mirror 242, third mirror 244 and fourth mirror 246 are placed in the light path, the light signals go through two reflections in order to travel to the targeted output. For example, a light signal transmitted by first input fiber 250 will bounce off first mirror 240 and second mirror 242 in order to reach first output fiber 254. The first input fiber 250, first mirror 240, second mirror 242 and first output fiber 254 are disposed at angles relative to each other such that the light signal sent by first input fiber 250 reaches first output fiber 254 with high stability.

A light signal transmitted by second input fiber travels a similar path as that described for first input fiber 250. A light signal transmitted from second input fiber 252 will bounce off third mirror 244 and fourth mirror 246 in order to reach second output fiber 256. The second input fiber 252, third mirror 244, fourth mirror 246 and second output fiber 256 are disposed at angles relative to each other such that the light signal sent by second input fiber 252 reaches second output fiber 256 with high stability. When the mirrors 240, 242, 244, 246 are removed from the light path, the light signal goes from first input fiber 250 to second output fiber 256 and from second input fiber 252 to first output fiber 254. Note, however, that when first mirror 240, second mirror 242, third mirror 244 and fourth mirror 246 are removed from the light path, the light paths intersect. This could cause optical interference.

Figure 12:
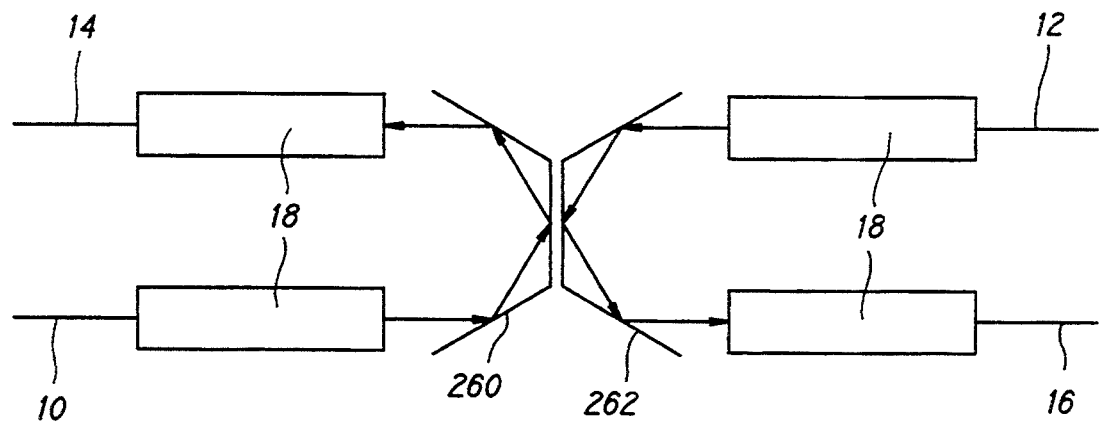
FIG. 12 is a top view of a reflector assembly and optical fiber arranged in accordance with aspects of the invention.

FIG. 12 shows yet another embodiment of the invention. This embodiment replaces the first mirror 22 and second mirror 24 with a first three-faced mirror 260 and a second three-faced mirror 262. The first input fiber 10, second input fiber 12, first output fiber 14 and second output fiber 16 are disposed in the same manner as the embodiments of FIGS. 1–2, 6–7 and 9. When the first three-faced mirror 260 and second three-faced mirror 262 are placed in the light path, the light signals transmitted by first input fiber 10 and second input fiber 12 go through a series of three reflections off first three-faced mirror 260 and second three-faced mirror 262, respectively. This is unlike the prior embodiments, where only two reflections were required in order to transmit the light signal for first input fiber 10 and second input fiber 12 to first output fiber 14 and second output respectively.

Figure 13:
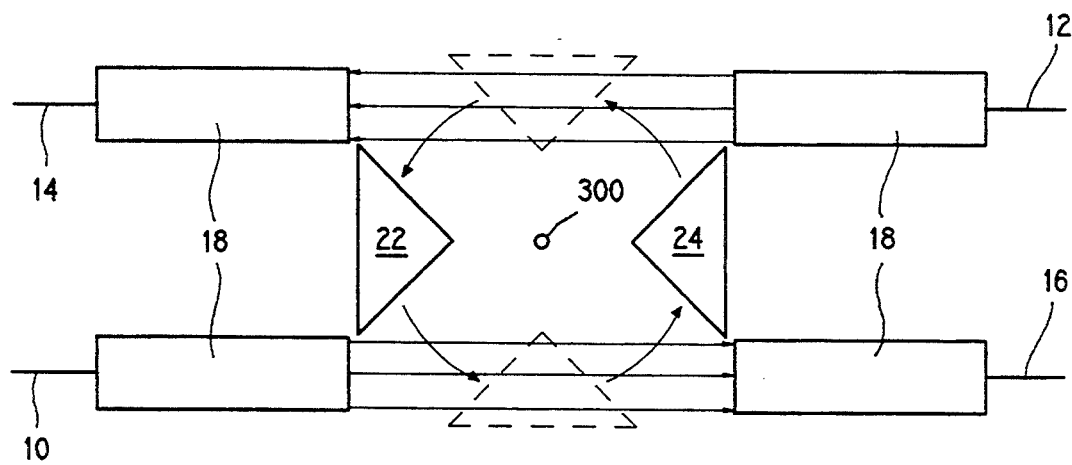
FIG. 13 is a top view of an alternative embodiment where the reflector assembly rotates on a motor.
Figure 14:
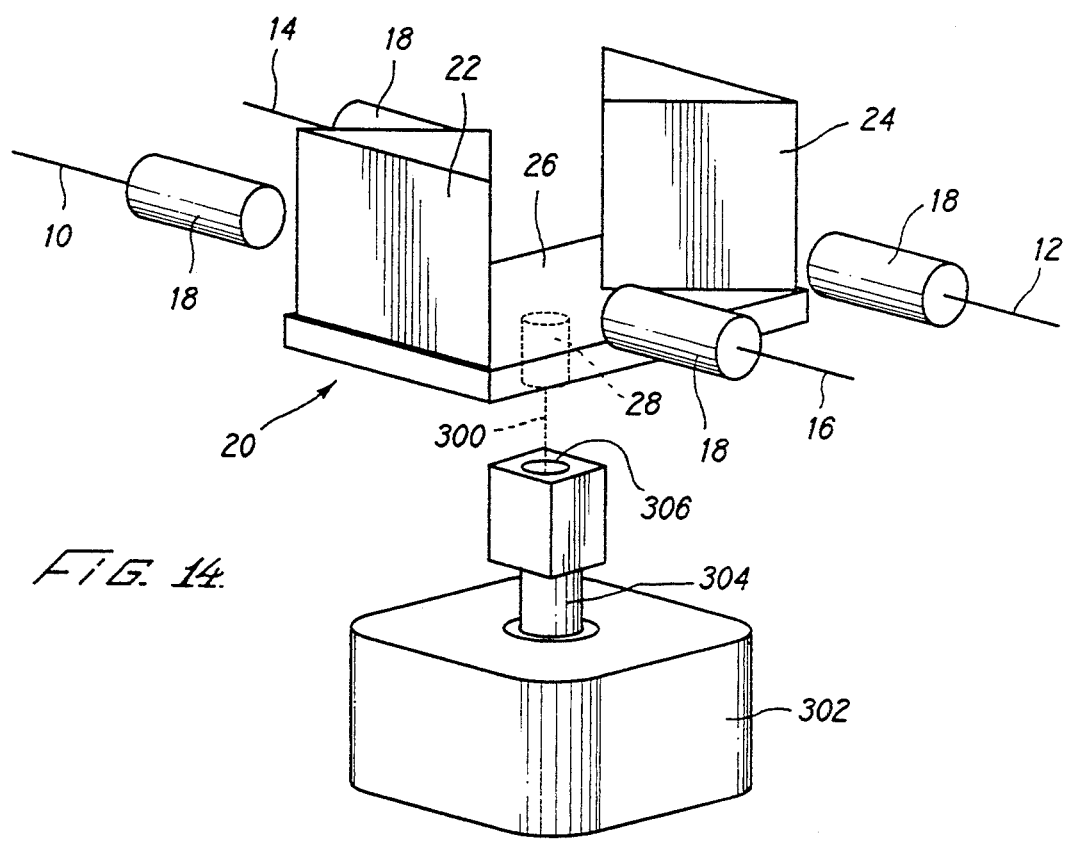
FIG. 14 is a two-by-two fiber optic switch made in accordance with the aspects of the invention.

FIG. 13 and FIG. 14 show still yet another embodiment of the invention. In this embodiment, the reflector assembly 20 is mounted on a motor 302. The reflector assembly 20 rotates about the motor 302 axis 300 through shaft 304 such that it is either in the light path or it is not. The reflector assembly 20 has holding bar 28 that is inserted into mounting hole 306. This effectuates mounting between reflector assembly 20 and motor 302. The motor 302 need only rotate the reflector assembly 20 in one direction due to the symmetric geometries of the device. First input fiber 10 and first output fiber 14 must be placed far enough apart such that the first mirror 22 and second mirror 24 can fit between the unreflected light paths. Second output fiber 16 remains collinear with first input fiber 10 and second input fiber 12 remains collinear with first output fiber 14. The unreflected light path is shown in FIG. 13. The reflected light path is the same as that shown in FIG. 3.

Figure 17:
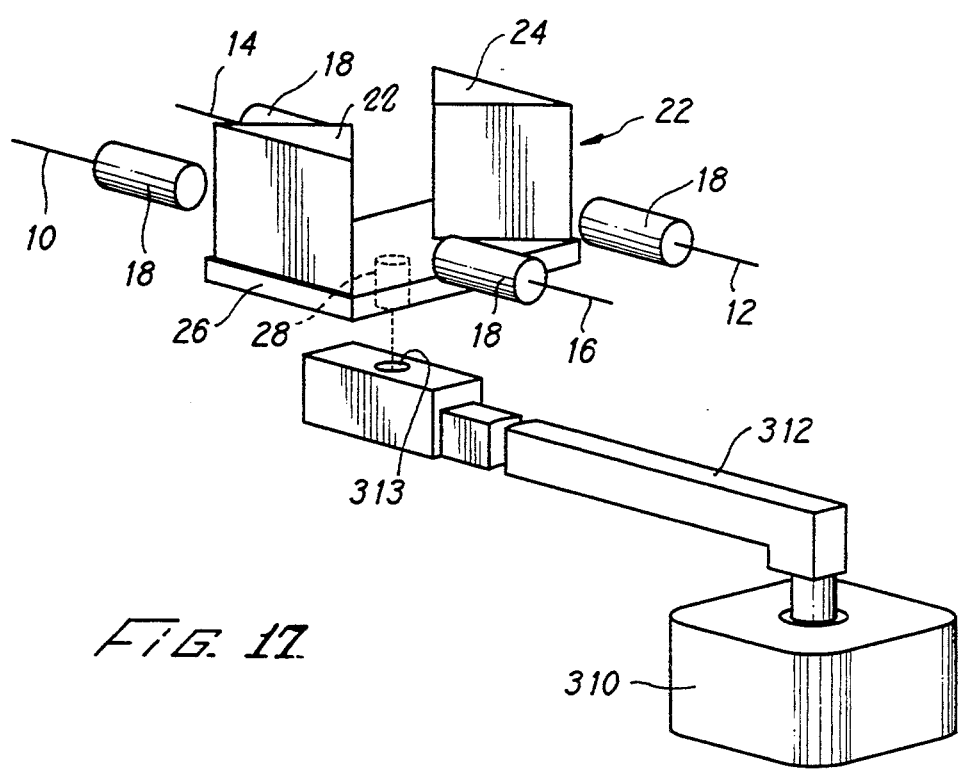
FIG. 17 is a perspective view of a two-by-two fiber optic switch made in accordance with the aspects of the invention.

FIG. 17 shows another embodiment utilizing a motor 310. Motor 310 is used to move armature 312 to the first and second position. Armature 312 has a mounting hole 313 that has holding bar 28 of the reflector assembly 22 inserted therein. The light paths in this embodiment will be the same as in FIG. 5.

An embodiment of the invention utilizing a motor 302 will have switching speeds that are faster than those of the moving magnetic cylinder 32. However, a motor 302 that would provide the torque and speed necessary in this application would require between twelve and twenty-four volts to operate. The industry, however, prefers the use of five volt devices, which the magnetic cylinder 32 embodiments can operate on.

It should be noted that all embodiments of the invention can be constructed so that they are stacked as a plurality of two-by-two switches. This will allow multiple data lines to be operated by a single mechanism.

Having thus described my invention, what I claim as new and desire to secure by Letters Patent of the United States of America is:

I claim:

1. A fiber optic switch comprising:
   a first input fiber, a second input fiber, a first output fiber and a second output fiber, said first input fiber being arranged so that it is substantially collinear with said second output fiber and adjacent and substantially parallel to said first output fiber, said second input fiber being arranged so that it is substantially collinear with said first output fiber and adjacent and substantially parallel to said second output fiber;
   a grade reflective index (GRIN) lens disposed on said first input fiber, said second input fiber, said first output fiber and said second output fiber;
   a movable reflector assembly, said movable reflector assembly comprising:
      a first reflector and a second reflector, said first reflector and said second reflector comprising a first reflector-first reflector surface, a first reflector-second reflector surface, a second reflector-first reflector surface and a second reflector-second reflector surface, wherein said first reflector-first reflector surface and said first reflector-second reflector surface have an angle of X degrees between them and wherein said second reflector-first reflector surface and said second reflector-second reflector surface have and angle of one-hundred eighty degrees minus X degrees between them so that said first reflector-second reflector surface and said second reflector-first reflector surface are disposed at ninety degree angles and said first reflector-first reflector surface and said second reflector-second reflector surface are also disposed at ninety degree angles; and
   a reflector assembly mover that moves said movable reflector assembly to a first position or a second position, said movable reflector assembly being between said first input fiber and said second input fiber when in said first position so that a light signal transmitted from said first input fiber through said GRIN lens on said first input fiber is reflected to said GRIN lens on said first output fiber.

2. The fiber optic switch of claim 1 wherein said reflector assembly mover comprises:
   a platform;
   a magnetic cylinder disposed on said platform, said magnetic cylinder comprising a lumen disposed therethrough, said magnetic cylinder having a pivot disposed thereon;
   an armature disposed in said pivot on said magnetic cylinder comprising an armature proximal end and an armature distal end, said armature being rotatably mounted on a bearing located at said armature proximal end, said movable reflector assembly mounted on said armature distal end;
   a bar running through said lumen in said magnetic cylinder having a bar proximal end and a bar distal end, said bar having greater length than said magnetic cylinder;
   a first stopper disposed at said bar distal end and a second stopper disposed at said bar proximal end;
   a first iron disposed at said first stopper and a second iron disposed at said second stopper; and
   an electrically conductive wire that is wrapped around said first iron and said second iron so that an electric current in said wire will produce a magnetic field of a first polarity in said first iron and an opposite magnetic polarity in said second iron, said first magnetic field and said opposite magnetic fields capable of pushing or pulling said magnetic cylinder along said bar, thereby causing said magnetic cylinder to rest against either said first stopper or said second stopper and moving said armature so that it places said movable reflector assembly in said first position or second position.

3. The fiber optic switch of claim 2 wherein said pivot comprises a V shaped slot that allows said armature to move said magnetic cylinder along said platform.

4. The fiber optic switch of claim 2 wherein said pivot comprises:
a pin disposed on said magnetic cylinder that is inserted into a slot formed in said armature that allows said armature to move said magnetic cylinder along said platform.

5. The fiber optic switch of claim 2 wherein said first iron and second iron comprise soft iron.

6. The fiber optic switch of claim 1 wherein said reflector assembly mover comprises:
a platform;
a magnetic cylinder disposed on said platform, said magnetic cylinder comprising a lumen disposed therethrough, said magnetic cylinder having a pivot disposed thereon;
an armature disposed on said pivot on said magnetic cylinder, said armature comprising an armature proximal end and an armature distal end, said armature being rotatably mounted on a bearing located at said armature proximal end, said movable reflector assembly mounted on said armature distal end;
a bar running through said lumen in said magnetic cylinder having a bar proximal end and a bar distal end, said bar having greater length than said magnetic cylinder;
a first stopper disposed at said bar distal end and a second stopper disposed at said bar proximal end;
a first iron disposed at said bar distal end and a second iron disposed at said bar proximal end;
a spring disposed between said magnetic cylinder and said second iron that surrounds said bar, said spring biasing said magnetic cylinder against said first stopper, thereby placing said movable reflector assembly in said first position;
an electrically conductive wire that is wrapped around said first iron and said second iron so that an electric current in said wire will produce a magnetic field of a first polarity in said first iron and an opposite magnetic polarity in said second iron, said first magnetic field and said opposite magnetic fields capable of pushing said magnetic cylinder along said bar and against said spring, thereby causing said magnetic cylinder to rest against said second stopper and moving said armature so that it places said movable reflector assembly in said second position.

7. The fiber optic switch of claim 6 wherein said first iron and said second iron comprise soft iron.

8. The fiber optic switch of claim 6 wherein said pivot comprises a V shaped slot that allows said armature to move said magnetic cylinder along said platform.

9. The fiber optic switch of claim 6 wherein said pivot comprises a pin disposed on said magnetic cylinder that is inserted into a slot formed in said armature that allows said armature to move said magnetic cylinder along said platform.

10. The fiber optic switch of claim 1 wherein said reflector assembly mover comprises:
a platform;
a magnetic cylinder disposed on said platform, said magnetic cylinder comprising a lumen disposed therethrough, said magnetic cylinder having said movable reflector assembly mounted thereon;
a bar running through said lumen in said magnetic cylinder having a proximal end and a distal end, said bar having greater length than said magnetic cylinder;
a first stopper disposed at said distal end of said bar and a second stopper disposed at said proximal end of said bar;
a first iron disposed at said first stopper and a second iron disposed at said second stopper; and
an electrically conductive wire that is wrapped around said first iron and said second iron so that an electric current in said wire will produce a magnetic field of a first polarity in said first iron and an opposite magnetic polarity in said second iron, said first magnetic field and said opposite magnetic fields capable of pushing or pulling said magnetic cylinder along said bar, thereby causing said magnetic cylinder to rest against either said first stopper or said second stopper and placing said movable reflector assembly in said first position or second position.

11. The fiber optic switch of claim 10 wherein said first iron and second iron comprise soft iron.

12. The switch of claim 1 wherein said reflector assembly mover comprises:
a platform;
a magnetic cylinder disposed on said platform, said magnetic cylinder comprising a lumen disposed therethrough, said magnetic cylinder having said movable reflector assembly mounted thereon;
a bar running through said lumen in said magnetic cylinder having a proximal end and a distal end, said bar having greater length than said magnetic cylinder;
a first stopper disposed at said bar distal end and a second stopper disposed at said bar proximal end;
a first iron disposed at said bar distal end and a second iron disposed at said bar proximal end;
a spring disposed between said magnetic cylinder and said second iron that surrounds said bar, said spring biasing said magnetic cylinder against said first stopper, thereby placing said movable reflector assembly in said first position; and
an electrically conductive wire that is wrapped around said first iron and said second iron so that an electric current in said wire will produce a magnetic field having polarity in said first iron and an opposite magnetic polarity in said second iron, said first magnetic field and said opposite magnetic fields capable of pushing said magnetic cylinder along said bar and against said spring, thereby causing said magnetic cylinder to rest against said second stopper, thereby placing said movable reflector assembly in said second position.

13. The fiber optic switch of claim 12 wherein said first iron and said second iron comprise soft iron.

14. The fiber optic switch of claim 1 wherein said first reflector and said second reflector are surface coated front reflecting type mirrors.

15. The fiber optic switch of claim 1 wherein said first reflector and said second reflector are shaped as right-isosceles triangles.

16. The fiber optic switch of claim 1 comprising a plurality of said fiber optic switches thereby comprising a fiber optic switching matrix.

17. A two-by-two fiber optic switch comprising:

a first input fiber, a second input fiber, a first output fiber and a second output fiber, said first input fiber being arranged so that it is substantially collinear with said second output fiber and adjacent and substantially parallel to said first output fiber, said second input fiber being arranged so that it is substantially collinear with said first output fiber and adjacent and substantially parallel to said second output fiber;

a grade reflective index (GRIN) lens disposed on said first input fiber, said second input fiber, said first output fiber and said second output fiber;

a movable reflector assembly, said movable reflector assembly comprising:

a first mirror and a second mirror, said first mirror and said second mirror comprising a first mirror-first mirror surface, a first mirror-second mirror surface, a second mirror-first mirror surface and a second mirror-second mirror surface, wherein said first mirror-first mirror surface and said first mirror-second mirror surface have an angle of X degrees between them and wherein said second mirror-first mirror surface and said second mirror-second mirror surface have and angle of one-hundred eighty degrees minus X degrees between them so that said first mirror-second mirror surface and said second mirror-first mirror surface are disposed at ninety degree angles and said first mirror-first mirror surface and said second mirror-second mirror surface are also disposed at ninety degree angles; and moving means for moving said movable reflector assembly to a first position or a second position, said movable reflector assembly being between said first input fiber and said second input fiber when in said first position so that a light signal transmitted from said first input fiber through said GRIN lens on said first input fiber is reflected to said GRIN lens on said first output fiber.

18. The two-by-two fiber optic switch of claim 17 wherein said moving means comprises:

a platform;

a magnetic cylinder disposed on said platform, said magnetic cylinder comprising a lumen disposed therethrough, said magnetic cylinder having a pivot disposed thereon;

an armature disposed in said pivot on said magnetic cylinder comprising an armature proximal end and an armature distal end, said armature being rotatably mounted on a bearing located at said armature proximal end, said movable reflector assembly mounted on said armature distal end;

a bar running through said lumen in said magnetic cylinder having a bar proximal end and a bar distal end, said bar having greater length than said magnetic cylinder;

a first stopper disposed at said bar distal end and a second stopper disposed at said bar proximal end;

a first iron disposed at said first stopper and a second iron disposed at said second stopper; and an electrically conductive wire that is wrapped around said first iron and said second iron so that an electric current in said wire will produce a magnetic field of a first polarity in said first iron and an opposite magnetic polarity in said second iron, said first magnetic field and said opposite magnetic fields capable of pushing or pulling said magnetic cylinder along said bar, thereby causing said magnetic cylinder to rest against either said first stopper or said second stopper and moving said armature so that it places said movable reflector assembly in said first position or second position.

19. The fiber optic switch of claim 18 wherein said pivot comprises a V shaped slot that allows said armature to move said magnetic cylinder along said platform.

20. The fiber optic switch of claim 18 wherein said pivot comprises a pin disposed on said magnetic cylinder that is inserted into a slot formed in said armature that allows said armature to move said magnetic cylinder along said platform.

21. The two-by-two fiber optic switch of claim 18 wherein said first iron and second iron comprise soft iron.

22. The two-by-two fiber optic switch of claim 17 wherein said moving means comprises:

a platform;

a magnetic cylinder disposed on said platform, said magnetic cylinder comprising a lumen disposed therethrough, said magnetic cylinder having a pivot disposed thereon;

an armature disposed in said pivot on said magnetic cylinder, said armature comprising an armature proximal end and an armature distal end, said armature being rotatably mounted on a bearing located at said armature proximal end, said movable reflector assembly mounted on said armature distal end;

a bar running through said lumen in said magnetic cylinder having a bar proximal end and a bar distal end, said bar having greater length than said magnetic cylinder;

a first stopper disposed at said bar distal end and a second stopper disposed at said bar proximal end;

a first iron disposed at said bar distal end and a second iron disposed at said bar proximal end;

a spring disposed between said magnetic cylinder and said second iron that surrounds said bar, said spring biasing said magnetic cylinder against said first stopper, thereby placing said movable reflector assembly in said first position;

an electrically conductive wire that is wrapped around said first iron and said second iron so that an electric current in said wire will produce a magnetic field of a first polarity in said first iron and an opposite magnetic polarity in said second iron, said first magnetic field and said opposite magnetic fields capable of pushing said magnetic cylinder along said bar and against said spring, thereby causing said magnetic cylinder to rest against said second stopper and moving said armature so that it places said movable reflector assembly in said second position.

23. The two-by-two fiber optic switch of claim 22 wherein said pivot comprises a V shaped slot that allows said armature to move said magnetic cylinder along said platform.

24. The fiber optic switch of claim 22 wherein said pivot comprises:

a pin disposed on said magnetic cylinder that is inserted into a slot formed in said armature that allows said armature to move said magnetic cylinder along said platform.

25. The two-by-two fiber optic switch of claim 22 wherein said first iron and said second iron comprise soft iron.

26. The two-by-two fiber optic switch of claim 17 wherein said moving means comprises:
   a platform;
   a magnetic cylinder disposed on said platform, said magnetic cylinder comprising a lumen disposed therethrough, said magnetic cylinder having said movable reflector assembly mounted thereon;
   a bar running through said lumen in said magnetic cylinder having a proximal end and a distal end, said bar having greater length than said magnetic cylinder;
   a first stopper disposed at said distal end of said bar and a second stopper disposed at said proximal end of said bar;
   a first iron disposed at said first stopper and a second iron disposed at said second stopper; and
   an electrically conductive wire that is wrapped around said first iron and said second iron so that an electric current in said wire will produce a magnetic field of a first polarity in said first iron and an opposite magnetic polarity in said second iron, said first magnetic field and said opposite magnetic fields capable of pushing or pulling said magnetic cylinder along said bar, thereby causing said magnetic cylinder to rest against either said first stopper or said second stopper and placing said movable reflector assembly in said first position or second position.

27. The two-by-two fiber optic switch of claim 26 wherein said first iron and second iron comprise soft iron.

28. The two-by-two fiber optic switch of claim 17 wherein said moving means comprises:
   a platform;
   a magnetic cylinder disposed on said platform, said magnetic cylinder comprising a lumen disposed therethrough, said magnetic cylinder having said movable reflector assembly mounted thereon;
   a bar running through said lumen in said magnetic cylinder having a proximal end and a distal end, said bar having greater length than said magnetic cylinder;
   a first stopper disposed at said bar distal end and a second stopper disposed at said bar proximal end;
   a first iron disposed at said bar distal end and a second iron disposed at said bar proximal end;
   a spring disposed between said magnetic cylinder and said second iron that surrounds said bar, said spring biasing said magnetic cylinder against said first stopper, thereby placing said movable reflector assembly in said first position; and
   an electrically conductive wire that is wrapped around said first iron and said second iron so that an electric current in said wire will produce a magnetic field having polarity in said first iron and an opposite magnetic polarity in said second iron, said first magnetic field and said opposite magnetic fields capable of pushing said magnetic cylinder along said bar and against said spring, thereby causing said magnetic cylinder to rest against said second stopper, thereby placing said movable reflector assembly in said second position.

29. The two-by-two fiber optic switch of claim 28 wherein said first iron and said second iron comprise soft iron.

30. The two-by-two fiber optic switch of claim 17 wherein said first mirror and said second mirror are surface coated front reflecting type mirrors.

31. The two-by-two fiber optic switch of claim 17 wherein said first mirror and said second mirror are shaped as right-isosceles triangles.

32. A two-by-two fiber optic switch comprising:
   a first input fiber, a second input fiber, a first output fiber and a second output fiber, said first input fiber being arranged so that it is collinear with said second output fiber and adjacent and parallel to said first output fiber, said second input fiber being arranged so that it is collinear with said first output fiber and adjacent and parallel to said second output fiber;
   a grade reflective index (GRIN) lens disposed on said first input fiber, said second input fiber, said first output fiber and said second output fiber;
   a reflector assembly comprising a first mirror, a second mirror and a platform, said first mirror and said second mirror having front surface coating and said first mirror and said second mirror each having right-isosceles triangle shape with an input mirror surface and an output mirror surface;
   a platform;
   a magnetic cylinder disposed on said platform, said magnetic cylinder comprising a lumen disposed therethrough, said magnetic cylinder having said reflector assembly mounted thereon;
   a bar running through said lumen in said magnetic cylinder having a proximal end and a distal end, said bar having greater length than said magnetic cylinder;
   a first stopper disposed at said distal end of said bar and a second stopper disposed at said proximal end of said bar;
   a first iron disposed at said first stopper and a second iron disposed at said second stopper; and
   an electrically conductive wire that is wrapped around said first iron and said second iron so that an electric current in said wire will produce a magnetic field of a first polarity in said first iron and an opposite magnetic polarity in said second iron, said first magnetic field and said opposite magnetic fields capable of pushing or pulling said magnetic cylinder along said bar, thereby causing said magnetic cylinder to rest against either said first stopper or said second stopper and placing said reflector assembly in a first position or a second position, said reflector assembly being between said first input fiber and said second input fiber when in said first position so that a light signal transmitted from said first input fiber through said GRIN lens on said first input fiber, hits said first mirror, reflects to said second mirror, and then reflects to said GRIN lens on said first output fiber.

33. A two-by-two fiber optic switch comprising:
   a first input fiber, a second input fiber, a first output fiber and a second output fiber, said first input fiber being arranged so that it is collinear with said second output fiber and adjacent and parallel to said first output fiber, said second input fiber being arranged so that it is collinear with said first output fiber and adjacent and parallel to said second output fiber;
   a grade reflective index (GRIN) lens disposed on said first input fiber, said second input fiber, said first output fiber and said second output fiber;
   a reflector assembly comprising a first mirror, a second mirror and a platform, said first mirror and said second mirror having front surface coating and said first mirror and said second mirror each having right-isosceles triangle shape with an input mirror surface and an output mirror surface;

a platform;

a magnetic cylinder disposed on said platform, said magnetic cylinder comprising a lumen disposed therethrough, said magnetic cylinder having said reflector assembly mounted thereon;

a bar running through said lumen in said magnetic cylinder having a proximal end and a distal end, said bar having greater length than said magnetic cylinder;

a first stopper disposed at said distal end of said bar and a second stopper disposed at said proximal end of said bar;

a first iron disposed at said distal end of said bar and a second iron disposed at said proximal end of said bar;

a spring disposed between said magnetic cylinder and said second iron that surrounds said bar, said spring biasing said magnetic cylinder against said first stopper, thereby placing said reflector assembly in said first position; and an electrically conductive wire that is wrapped around said first iron and said second iron so that an electric current in said wire will produce a magnetic field of a first polarity in said first iron and an opposite magnetic polarity in said second iron, said first magnetic field and said opposite magnetic fields capable of pushing said magnetic cylinder along said bar and against said spring, thereby causing said magnetic cylinder to compress said spring and rest against said second stopper, thereby placing said reflector assembly in said second position, said reflector assembly being between said first input fiber and said second input fiber when in said first position so that a light signal transmitted from said first input fiber through said GRIN lens on said first input fiber, hits said first mirror, reflects to said second mirror, and then reflects to said GRIN lens on said first output fiber and said reflector assembly not being between said first input fiber and said second output fiber when in said second position so that a light signal transmitted from said first input fiber through said GRIN lens on said first input fiber travels directly to said GRIN lens of said second output fiber.

* * * * *